March 26, 1957

L. H. SATRE ET AL

2,786,385

COMPARATOR FOR STEREOTYPE MATS AND THE LIKE

Filed Oct. 19, 1953

INVENTORS.
LELAND H. SATRE
CRAIG C. BAKER

BY THEIR ATTORNEYS
HARRIS, KIECH, FOSTER & HARRIS

March 26, 1957  L. H. SATRE ET AL  2,786,385
COMPARATOR FOR STEREOTYPE MATS AND THE LIKE
Filed Oct. 19, 1953  6 Sheets-Sheet 3

INVENTORS.
LELAND H. SATRE
CRAIG C. BAKER
BY THEIR ATTORNEYS
HARRIS, KIECH, FOSTER & HARRIS

INVENTORS.
LELAND H. SATRE
CRAIG C. BAKER
BY THEIR ATTORNEYS
HARRIS, KIECH, FOSTER & HARRIS

March 26, 1957 L. H. SATRE ET AL 2,786,385
COMPARATOR FOR STEREOTYPE MATS AND THE LIKE
Filed Oct. 19, 1953 6 Sheets-Sheet 6

INVENTORS.
LELAND H. SATRE
CRAIG C. BAKER
BY THEIR ATTORNEYS
HARRIS, KIECH, FOSTER & HARRIS

2,786,385

COMPARATOR FOR STEREOTYPE MATS AND THE LIKE

Leland H. Satre, Pasadena, and Craig C. Baker, Arcadia, Calif., assignors to Sta-Hi Corporation, Whittier, Calif., a corporation of Oregon Application October 19, 1953, Serial No. 386,968

3 Claims. (Cl. 88—24)

The present invention relates generally to the production of printing plates utilized in printing complete reproduction by superimposing two or more partial reproductions, this procedure being employed primarily in color reproductions, such as newspaper comics, wherein two or more partial reproductions in different colors are superimposed to obtain complete reproductions in color. However, it will be understood that the invention is not to be regarded as limited to the production of printing plates for printing superimposed partial reproductions in different colors since, in some instances, superimposed partial reproductions in the same color may be desirable. Also, while the present invention is particularly applicable to the production of printing plates from stereomatrices or mats utilized in casting the printing plates by employing the principles of the invention in connection with the mats themselves, it will be understood that the principles of the invention may be employed in connection with structures other than mats, such as the printing plates themselves in some instances. Also, the invention may be utilized in connection with reproductions to check their registrability. Consequently, the term "mat" is at times used very broadly herein to denote any structure which may be compared to a complementary structure, although the term will be utilized primarily herein in accordance with its usual definition, viz., a stereomatrix of papier-mâché, or the like.

Considering the production of printing plates for color comics in the newspaper industry as an example, the procedure utilized at present is to cast printing plates from the mats corresponding to the colors involved, the plates then being placed on a press and a proof being run to determine if the colors register. If they do not, which is usually the case, attempts to bring the colors into register by trial and error follow. In the process of registering color plates, the error between the key plate and one of the auxiliary plates can be expressed as two translational deviations and one angular deviation. This is usually expressed as the color from the auxiliary plate being high or low, left or right, and twisted clockwise or counterclockwise with respect to the key plate. The plates on a rotary press are usually semi-cylindrical and the relationship between a plate and the press cylinder involves two mating cylindrical surfaces. It is possible to move the plate parallel to itself either axially or circumferentially on the cylinder to bring the impressions into register. However, it is difficult to rotate the plate even slightly since the cylindrical surfaces tend to force the plate away from the cylinder, leaving the plate in contact at only two corners. The clips that hold the plate on the cylinder must be tightened excessively to force the plate to the curvature of the cylinder again, which causes the plate to warp and, though it will stay on the cylinder, it makes only imperfect contact therewith. The pressure of the blanket cylinder on the plate with each revolution of the press will cause the plate to flex into contact with the plate cylinder. This constant flexing eventually will cause the plate to crack and break, and, if the press is running at high speed, considerable damage may result. On the so-called tubular presses, the plates are practically complete cylinders. Actually they have gaps about an inch wide which allows them to be slipped onto the press cylinder over the narrow bearing support. It is impossible to twist a plate on this type of press because of this construction.

In view of the foregoing, the main objective of this invention is to keep the impressions on the plates in the same relative positions to the axis of the plate cylinder to eliminate the necessity for trying to twist the plates on the press.

More particularly, a primary object of the present invention is to obviate the foregoing difficulties of present practice by registering the mats prior to casting printing plates therefrom.

More particularly, an object of the present invention is to provide an apparatus for registering the auxiliary mats of a mat set with the key mat thereof by registering superimposed images of the mats, the mats being provided with registering locating edges, or other locating means, thereon which are subsequently utilized to provide corresponding printing plates with similar locating edges by casting the printing plates from the mats in a mold or molds with the locating edges of the mats in the same relative positions in the mold or molds. When printing plates cast in this manner are installed on a press with the resulting locating edges of the plates properly located on the press, proper color registration is obtained with a minimum of the trial and error procedure required by present practice, which is an important feature of the invention.

Another object of this invention is to provide a means for comparing sets of mats, plates, cuts, copy, etc., to determine whether it will be possible to bring them into register, i. e., to provide an accurate and fast means for proofing the material in each stage to be sure that the accuracy of the preceding stage has been maintained.

Another object of the invention is to provide an apparatus for producing full page mat sets from partial-page mat sets wherein accurate registration of the various sections of such built-up full page mats is obtained. More particularly, an object in this connection is to provide an apparatus for comparing the auxiliary partial-page mats of a partial-page mat set to the key partial-page mat thereof, this procedure being followed for each partial-page mat set going into a built-up full page mat set. The various key and auxiliary partial-page mats going into such a built-up full page mat set are provided with registering mating edges and locating holes, or other locating means, the mating edges being brought into abutting relation in a jig which provides locating pins, or other locating elements, engageable with the locating holes or other locating means. In other words, the mating edges of the partial-page mats going into a built-up full page mat are brought into abutting relation in such a jig and the partial-page mats are then secured together in any suitable manner, as by taping, for example.

Another and important object of the invention is to provide a simple and compact optical system for superimposing images of two mats to be brought into register, and to provide in conjunction therewith two holding means for the respective mats, the holding means being flat vacuum platens in the case of flat mats, although other holding means may be used as will appear hereinafter.

More particularly, an object of the invention is to provide an optical comparator which includes full and partial mirrors spaced apart along an optical path having an observation point at one end thereof, with the partial mirror between the full mirror and the observation point, and which includes first and second platens respectively located directly in the field of and facing the partial and full mirrors so that the partial mirror projects an image of the first platen along the optical path toward the observation point and so that the full mirror projects an image of the second platen along the optical path and through the partial mirror toward the observation point. The result of this arrangement is a very compact optical system which provides superimposed images of the two platens to the eye of an observer at the observation point, means for varying the relative illumination of the two platens being provided so that the two images may be made of equal intensity for comparison purposes. As will be apparent, by placing mats on the respective platens, and by varying the relative illumination of the mats, the images of the two mats on the platens may be made substantially equal in intensity so that registration of the mat images can be obtained by shifting one of the mats relative to the other.

Another object is to provide such an optical comparator wherein the mirrors are positioned at approximately 45° to the optical path and wherein the platens are parallel to the optical path. In other words, the mirrors make angles of approximately 45° with the platens.

Another object is to provide an optical comparator wherein the platens are both disposed below the optical path and face upwardly to facilitate placing the mats to be compared on the platens.

Still another object of the invention is to provide vacuum means for holding the mats on the platens to prevent shifting thereof. Another object in this connection is to provide a vacuum means incorporated in each platen which comprises a plurality of vacuum chambers communicating with the exterior of the platen by means of apertures, the invention providing valve means for selectively activating the vacuum chambers so that the vacuum means incorporated in each platen may be employed to hold either a full page mat or a partial-page mat.

Another object is to provide trimming means comprising a trimming device cooperable with an edge of one of the platens for trimming an edge of a mat thereon after the mat has been positioned properly on the platen.

Still another object is to provide punching means associated with one of the platens for punching locating holes in a mat on such platen, the other platen having pins thereon which are insertable into such locating holes to properly locate a punched mat on the other platen.

Another object is to provide marking means for making register marks on the mats.

The foregoing objects, advantages and features of the present invention, together with various other objects, advantages and features thereof which will become apparent, may be attained with the exemplary embodiments of the optical comparator of the invention which are illustrated in the accompanying drawings and which are described in detail hereinafter.

Referring to the drawings.

Figure 1:
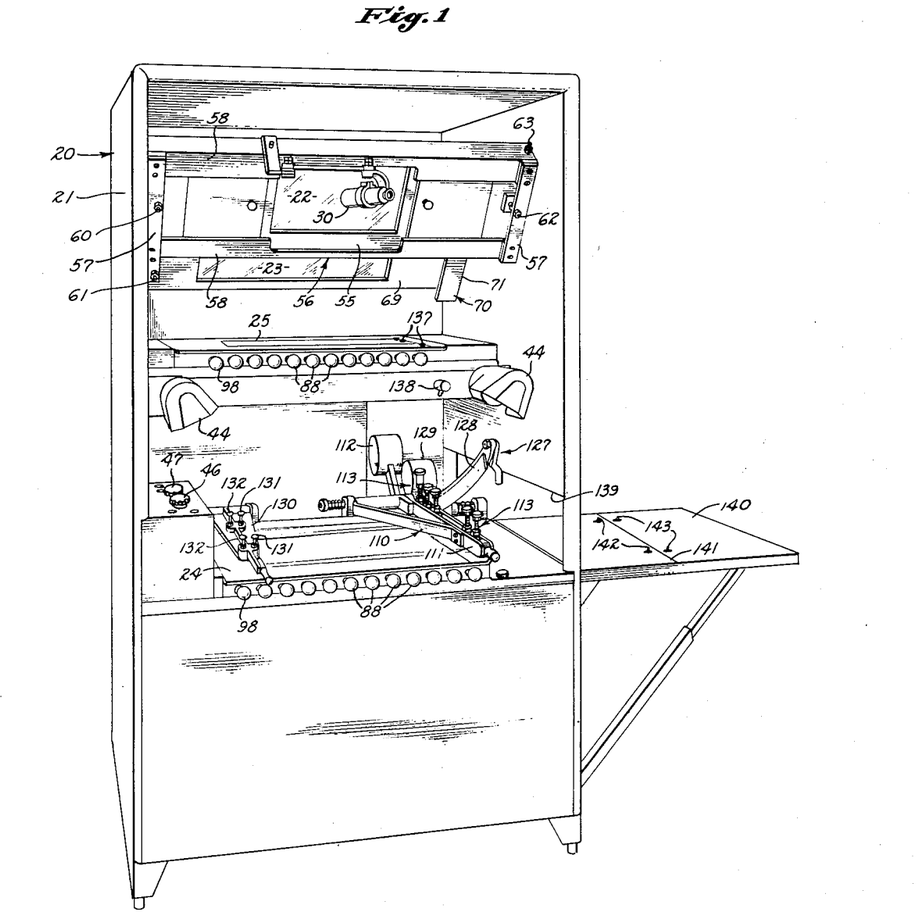
Fig. 1 is a front perspective view on a reduced scale illustrating an optical comparator which embodies the invention.
Figure 8:
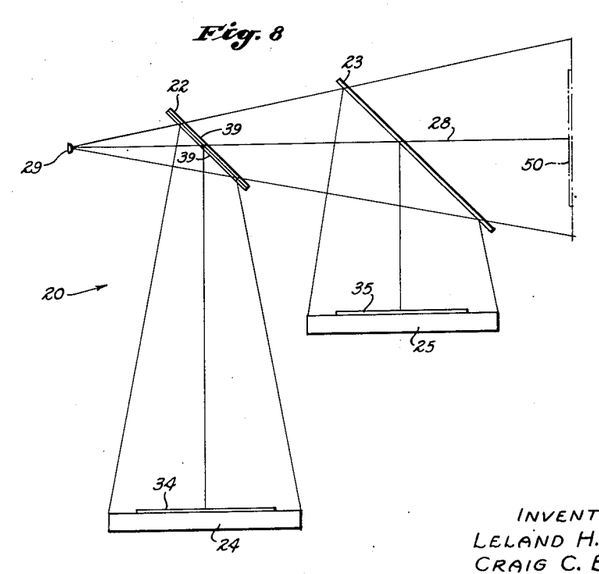
Fig. 8 is a diagrammatic view of the comparator illustrated in Figs. 1 to 7.

Referring first to Figs. 1 and 8 of the drawings in particular, the numeral 20 designates generally an optical comparator embodiment of the invention, the comparator 20 including a housing or cabinet 21 open at the front and having therein partial and full mirrors 22 and 23 and first and second, lower and upper platens 24 and 25. The partial and full mirrors 22 and 23 are spaced apart along an optical path 28 having an observation point 29 at one end thereof, the partial mirror 22 being disposed between the full mirror 23 and the observation point 29. Preferably, a suitable eyepiece 30 is located at the observation point 29. The first and second platens 24 and 25 are respectively disposed directly in the fields of and face the partial and full mirrors 22 and 23, these elements being so oriented relative to each other so that an image of the first platen 24, or a mat 34 thereon, is projected along the optical path 28 toward the observation point 29 by the partial mirror 22 and so that an image of the second platen 25, or a mat 35 thereon, is projected along the optical path 28 through the partial mirror 22 toward the observation point 29 by the full mirror 23. In the embodiment under consideration, which is the presently preferred embodiment of the invention, the mirrors 22 and 23 are disposed at angles of 45° to the optical path 28 and are parallel to each other, the platens 24 and 25 also being parallel to the optical path 28, i. e., being at angles of 45° to the mirrors 22 and 23, and being disposed on the same side of the optical path.

The partial mirror 22 may be formed of two plates 39 of glass cemented together, one of the plates 39 being partially coated with a reflective material and the two plates being cemented together with the reflective coating between the two plates. The plates 39 should be as flat as practicable and should have thicknesses as nearly equal as practicable, the partial mirror being installed in the cabinet 21 with the partially coated plate farthest from the observation point 29 since less of a reflective coating is required to obtain equal transmittance and reflectance in this position. The outer or exposed surfaces of the glass plates 39 are then coated with a low reflectance material to eliminate ghost reflections on the observer's side and to eliminate light loss on the other side, which light loss tends to reduce image brightness. The two plates 39 are necessary to provide light paths of equal length for transmitted light and reflected light, thereby equalizing any distortion. The full mirror 23 should be a first surface mirror to eliminate glass in the light path, which eliminates distortions due to refraction of light by the glass. The full mirror 23 should also be as flat as is practicable.

Figure 2:
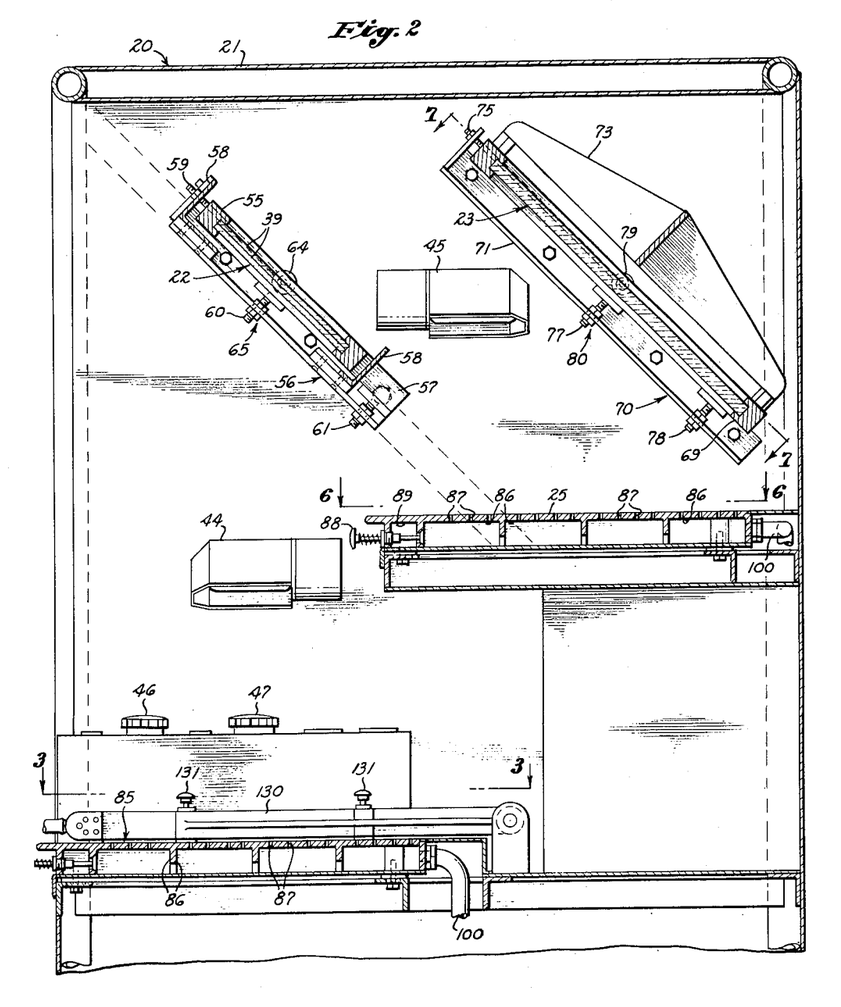
Fig. 2 is a fragmentary sectional view of the comparator taken in a vertical plane parallel to the sides of the comparator.

Light sources 44, Figs. 1 and 2, are provided for illuminating the first platen 24 and the mat 34 thereon, and light sources 45, one of which is visible in Fig. 2, are provided for illuminating the second platen 25 and the mat 35 thereon, controls 46 and 47, Fig. 1, being provided for the light sources 44 and 45, respectively. As will be understood, when the field behind the partial mirror 22 is dark, this mirror behaves like an ordinary mirror, but when the field therebehind is light, the mirror appears to be transparent. By adjusting the relative illumination of the platens 24 and 25 and/or the mats 34 and 35 thereon through the employment of the controls 46 and 47, images of both platens and/or mats will be visible at the observation point 29, the two images being of equal intensity when the relative illumination is properly adjusted. The two images appear at an apparent-image position 50, Fig. 8, which lies on the optical path 28. In other words, virtual images of the two platens 24 and 25 and/or mats 34 and 35 appear at the image position 50, the two images being superimposed at this position.

As will be apparent, the two mat images which appear superimposed at the image position 50 may be caused to register by shifting one or other of the mats 34 and 35 relative to its platen until registry is obtained. The degree of registry obtained depends on the relative accuracies with which the two mats have been formed and if either or both of the mats have been formed so inaccurately as to make satisfactory registry impossible, this fact is readily apparent and either or both may be discarded, as will be discussed in more detail hereinafter in considering the operation of the present invention and the method thereof.

Figure 7:
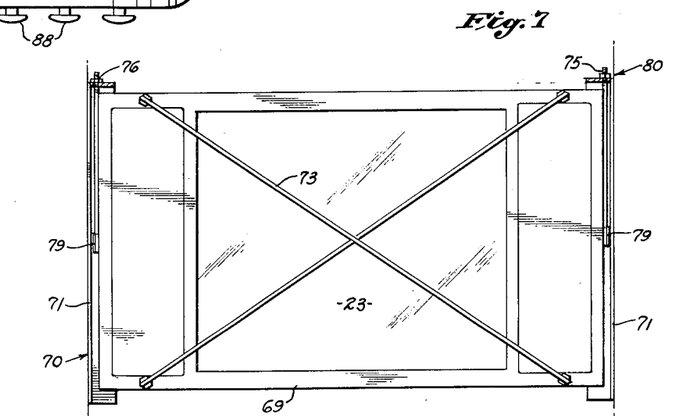

Considering the optical comparator 20 of the invention in more detail, the partial mirror 22 is mounted in a frame 55 which is adjustably carried by a mount 56 illustrated as comprising inclined members 57 respectively secured to the sides of the cabinet 21 and transverse members 58 extending between and secured to the inclined members 57. The mirror 22 is adjustably carried by the mount 56 by means of adjusting screws 59, 60, 61, 62 and 63 between the mount 56 and the frame 55, the frame being carried by pivots 64. The adjusting screws form an adjusting means 65 for adjusting the position of the mirror in any direction to secure proper orientation thereof. Similarly, the full mirror 23 is carried by a frame 69 which is adjustably supported by a mount 70 comprised of inclined members 71 respectively secured to the sides of the cabinet 21. Since, because of the optics of the system, the full mirror 23 must be relatively large, the frame 69 therefor includes a heavy X-shaped frame member 73, Figs. 2 and 7, which tends to prevent warping of the mirror 23. The mirror 23 is adjustably carried by adjusting screws 75, 76, 77 and 78 between the mount 70 and the frame 69, the frame being carried by pivots 79. These adjusting screws form an adjusting means 80 for properly orienting the full mirror 23. Normally, the adjusting means 65 and 80 are utilized to orient the mirrors 22 and 23 properly only when the comparator 20 is first put into operation, or in the event that the orientation of one of the mirrors is inadvertently altered.

Figure 3:
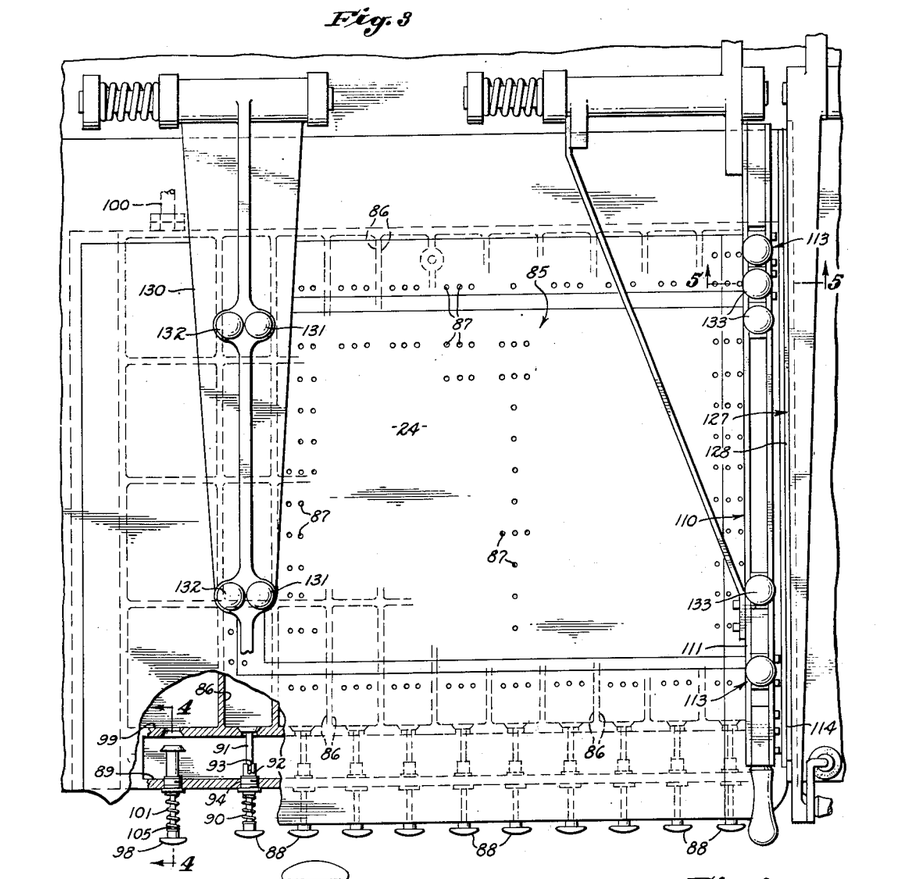
Fig. 3 is a plan view of a platen incorporated in the comparator and is taken as indicated by the arrowed line 3—3 of Fig. 2, Fig. 3 also illustrating a trimming means and punching means associated with the platen illustrated therein.
Figure 4:
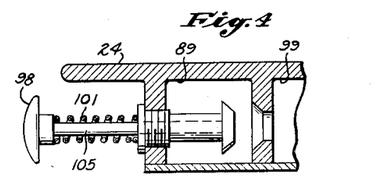
Figs. 4 and 5 are enlarged, fragmentary sectional views respectively taken along the arrowed lines 4—4 and 5—5 of Fig. 3.

Considering the first or lower platen 24 in more detail, it is provided with a grid 85 of lines utilized in positioning a mat, such as the mat 34, thereon, as will be discussed in more detail hereinafter. The platen 24 is hollow and is provided with a plurality of vacuum chambers 86 therein each of which communicates with the upper surface of the platen through a plurality of apertures 87. Selector valves 88 control communication between the respective vacuum chambers 86 and a manifold chamber 89 in the platen 24, these valves normally being biased closed by springs 90. Each selector valve 88 includes a plunger 91 carrying a pin 92 movable in a slot 93 in a sleeve 94 to permit the valve to close. When it is desired to close each valve 88, the plunger 91 is rotated to allow pin 92 to drop into slot 93. The corresponding plunger 91 is pushed in and rotated slightly to permit such pin to engage the outer end of the corresponding sleeve 94 to lock the valve open.

As will be apparent, the selector valves 88 may be opened or closed as desired by the operator to activate as many of the vacuum chambers 86 as required for the particular mat size being handled. In other words, if a mat covering the entire platen 24 is being handled, all of the selector valves 88 are opened. Conversely, if a mat covering only three or four of the vacuum chambers 86 is being handled, the corresponding selector valves are opened and the remainder are closed.

The manifold chamber 89 is evacuated through a main control valve 98 which controls communication between the manifold chamber and a chamber 99 in the platen 24, the chamber 99 being evacuated through a line 100 leading to a vacuum pump, or the like, not shown. If desired, such vacuum pump may be disposed in the bottom of the cabinet 21 below the level of the lower platen 24. As will be apparent, the main control valve 98 is biased open by a spring 101, and this valve may be closed by pushing the knob in until the valve seats. This valve 98 is at a convenient height so that it may be closed by leaning against it, thus leaving both hands free to manipulate a mat. Thus, the vacuum to the entire platen 24 may be cut off by means of the main control valve 98, as when placing, shifting, or removing a mat. The upper platen 25 is provided with a similar vacuum means including similar elements and a detailed description thereof is thought to be unnecessary.

Figure 5:
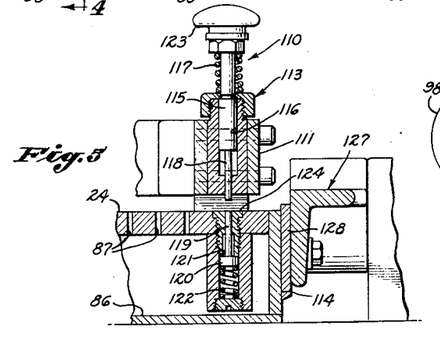

The optical comparator 20 of the invention includes punching means indicated generally by the numeral 110 and including a pivoted arm 111 adapted to be swung downwardly into an operative position, as shown throughout the drawings. The arm is provided with a counterweight 112 to help balance the arm and to keep it in position at either limit of travel. The arm 111 carries three punching devices 113 adjacent one edge 114 of the platen 24, one of the punching devices being shown in detail in Fig. 5 of the drawings. Referring thereto, the punching device 113 illustrated therein comprises a plunger 115 movable in a bore 116 in the arm 111 and biased upwardly by a spring 117. Carried by the plunger 115 and extending downwardly through the arm 111 is a punch 118 adapted to cooperate with a die 124 in the platen 24 itself. An ejector 119, which is carried by a plunger 120 which is disposed in a bore 121 in the platen and which is biased upwardly by a spring 122, ejects the piece of mat punched out. As will be apparent, by pushing downwardly on a knob 123 at the upper end of the plunger 115, a hole is punched through a mat on the platen 24 through the cooperation of the punch 118 and the die 124. The other punching devices 113 are identical and need not be described in detail.

Also associated with the platen 24 is a trimming means 127 comprising a conventional pivoted trimmer or trimmer blade 128 cooperable with the edge 114 of the platen 24, the trimmer blade 128 being provided with a counterweight 129, Fig. 1, to facilitate operation thereof.

Also associated with the platen 24 is a marking means comprising a pivoted arm 130 having two sets of marking devices 131 and 132 for narrow and wide mats, respectively. The arm 111 is provided with a set of marking devices 133 also forming part of the marking means. The marking devices 131, 132 and 133 are adapted to produce register marks on the mat for a purpose to be described and may be of any suitable construction. For example, the marking devices may be punches similar to the punching devices 113, or they may be stamping or printing devices, or the like.

Figure 6:
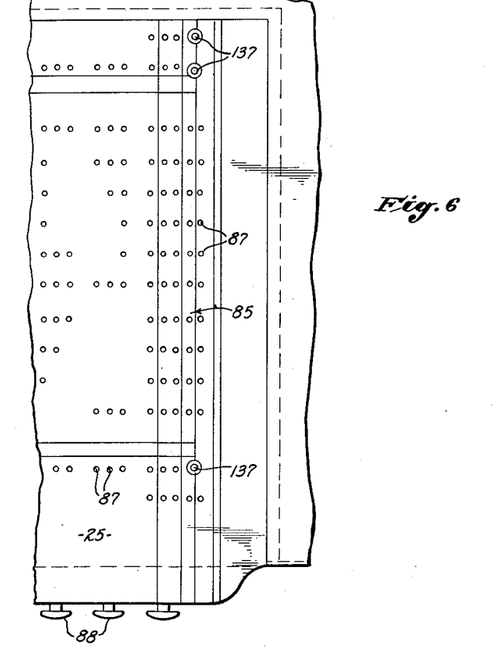
Figs. 6 and 7 are elevational views respectively taken along the arrowed lines 6—6 and 7—7 of Fig. 2 and respectively illustrating another platen and a mirror mount incorporated in the comparator.

As best shown in Fig. 6 of the drawings, the second or upper platen 25 is provided with locating pins 137 respectively insertable into holes punched in a mat by the punching devices 113 to properly locate on the upper platen 25 a mat punched on the lower platen 24 by the punching means 110. Ordinarily, only two locating holes will be punched in a mat by the punching means 110, three punching devices 113 being shown to take care of mats of different sizes. Consequently, the locating pins 137 are preferably spring biased downward in a manner not specifically shown so that only those pins that are in registry with punched holes in a mat are raised by cam means, or the like, not shown, controlled by a knob 138, Fig. 1.

As best shown in Fig. 1 of the drawings, at one side of the cabinet 21 is a table 140, accessible from the platen 24 through a window 139, which serves as a jig for securing together partial-page mats to make up a full page mat as will be discussed in detail hereinafter. If desired, this table may have scribed thereon a line 141 with which mating edges of two partial-page mats register when such edges have been trimmed in a manner to be discussed, and the table is provided with two locating pins 142 on one side of the line 141 and two locating pins 143 on the opposite side thereof, these pins being insertable in holes punched adjacent the mating edges of the partial-page mats to secure the partial-page mats in their proper relative positions while they are being taped, or otherwise fastened, together to make up a full page mat, all as will be discussed in more detail hereinafter.

Turning now to Figs. 9 to 12 of the drawings, the comparator operation will be considered first as applied to making up a full page mat set of key and auxiliary mats from corresponding sets of partial-page key and auxiliary mats. For convenience, the partial-page mats will be considered as half-page mats, but the same principles apply to making up full page mats from one-third page mats, or partial-page mats of other size.

Figure 9:
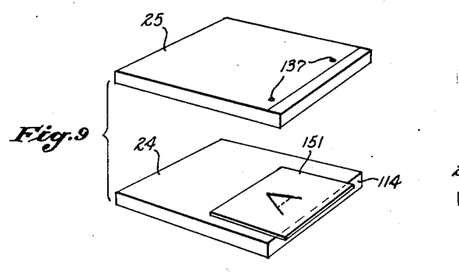
Figs. 9 to 15 are diagrammatic views illustrating the operation of the optical comparator illustrated in Figs. 1 to 8 and illustrating methods of the invention.
Figure 10:
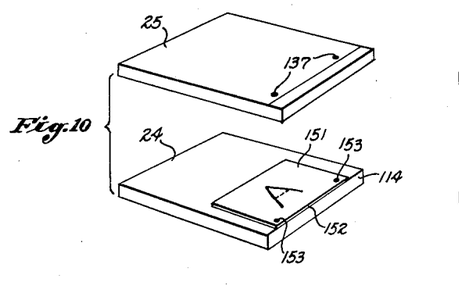

Referring first to Fig. 9 of the drawings, a key partial-page mat 151, representing what will ultimately be the top half of a built-up full page mat, is placed on the lower platen 24 adjacent the trimmer blade 128. Usually, a portion of the mat 151 will extend over the edge 114 of the platen 24. With the light sources 44 and 45 properly adjusted, the mat 151 is sifted around until it is properly oriented relative to a grid of lines on the upper platen 25 similar to the hereinbefore described grid of lines on the lower platen. When the proper orientation for the mat 151 has been established, one of the lines of the grid of the upper platen 25 coincides with the desired trimmed lower edge of the mat 151, or, more accurately, the images thereof coincide, it being understood that when coincidence or register of elements is referred to hereinafter, coincidence or register of images is what is actually produced. With the mat 151 properly positioned, the trimming means 127 is actuated to provide the mat 151 with a trimmed lower edge 152, vacuum having been applied before trimming to hold the mat 151 in place by activating the necessary number of the vacuum chambers 86. Also, as indicated in Fig. 10 of the drawings, the punching means 110 is actuated to punch holes 153 in the mat 151 adjacent the trimmed lower edge 152.

Figures 11, 15:
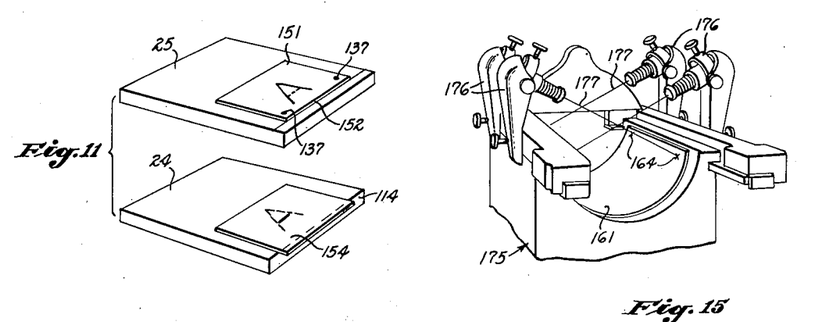

Referring now to Fig. 11 of the drawings, the next step is to transfer the key mat 151 to the upper platen 25, this mat being located on the upper platen by inserting the locating pins 137 in the holes 153. Subsequently, one of the auxiliary mats 154 (assuming that there are more than one auxiliary mat) is placed on the lower platen 24 and is shifted around until it is in register with the key mat 151 on the upper platen 25, vacuum having been applied to the key mat 151 to hold it in place. After the auxiliary mat 154 has been brought into register with the key mat 151 by means of the optical system hereinbefore described, the auxiliary mat 154 is trimmed and punched in the same manner as the key mat 151. This process is then repeated for the rest of the auxiliary mats, each being brought into register with the key mat 151, trimmed and punched. It will be understood, of course, that vacuum is applied to hold each auxiliary mat in place while trimming and punching.

Figure 12:
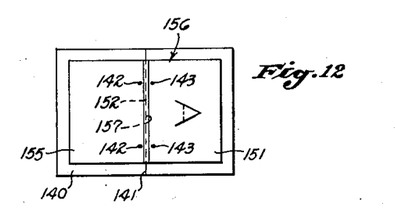

Thereafter, the foregoing operations are repeated with the partial-page mat set, the key mat and auxiliary mats of which are to make up the lower halves of the key and auxiliary mats of the ultimate full page mat set. The only difference is that, instead of trimming and punching the lower edges of the mat halves forming the lower halves of the mats of the full page set, the upper edges are trimmed and punched. In Fig. 12 of the drawings is shown a key mat 155 adapted to cooperate with the key mat 151 to form a full page key mat generally indicated by the numeral 156, the key mat 155 having a trimmed upper edge 157. The locating holes in the key mat 155 receive the pins 142 on the table or jig 140, and the locating holes in the key mat 151 receive the pins 143 on the jig, which results in bringing the trimmed edges 152 and 157 into abutting relation and into registry with the line 141. The key mats 151 and 155 may now be taped, or otherwise secured together, to form the built-up, full page, key mat 156. Similar operations are performed on the auxiliary mats corresponding to the key mats 151 and 155 until a complete set of full page mats is built up.

Figure 13:
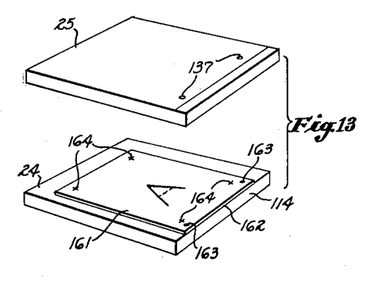
Figure 14:
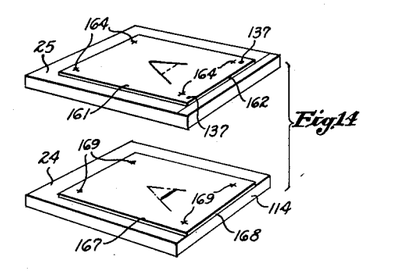

Turning now to Figs. 13 to 15 of the drawings, the handling of full page mat sets will now be considered. The key and auxiliary mats of such a full page mat set may either be full pages initially, or they may have been built up from partial-page mat sets in the manner hereinbefore discussed, it being immaterial for the following discussion how the full page mat set was obtained.

Referring particularly to Fig. 13, a key mat 161 is properly positioned on the lower platen in the same manner as was the partial-page mat 151, the only difference being that, when vacuum is applied, more of the vacuum chambers 86 are activated to apply vacuum to the entire area of the mat 161. The key mat 161 is then provided with a trimmed edge 162, if necessary, and locating holes 163 are punched therein by actuating the punching means 110. Also, the key mat 161 is provided with register marks 164 by the marking means, four such marks being shown, although this number may be varied. The vacuum is then released at the platen 24 and the punched, marked and partially trimmed mat 161 is then turned to trim each edge to a rough size larger than final size. Thereafter, the mat 161 is transferred to the upper platen 25, the pins 137 being inserted into the holes 163.

After the key mat 161 has been properly located on the upper platen 25, as shown in Fig. 14 of the drawings, vacuum is applied thereto to hold the key mat. Then, an auxiliary mat 167 is placed on the lower platen 24 and its image is brought into register with the key mat 161 in the manner hereinbefore described. Then, with vacuum applied to hold the auxiliary mat 167, any excess material is trimmed off to provide a trimmed edge 168, if necessary. Also, register marks 169 are applied in the same manner as the register marks 164, these register marks being in register with the register marks 164. It is not necessary to punch any holes in the auxiliary mats 167 corresponding to the holes 163 in the key mat 161. The auxiliary mat 167 is then removed from the platen 24 after releasing the vacuum, whereupon the foregoing procedure is repeated with any other auxiliary mats in the full page mat set.

Subsequently, the key mat and the auxiliary mats of the full page mat set are formed into semicylinders with any conventional apparatus to conform to the contour desired for the printing plates which, in turn, must conform to the design of the press in which they are to be used. In Fig. 15 of the drawings, the key mat 161 is shown curved to semicylindrical form and placed in a trimming apparatus 175, which may be similar to the trimming apparatus shown in Patent No. 2,631,669. With such a trimming apparatus, light sources 176 corresponding in number to the number of register marks 164 are provided, these light sources being adapted to produce needle-like rays 177 of light, as by being provided with suitable lenses, not shown, or they may project cross hair images. The key mat 161 is shifted until the four light rays 177 respectively impinge on the four register marks 164, which results in proper orientation of the curved key mat 161 in the trimming apparatus 175. A vacuum is then applied to the key mat 161 in substantially the same manner as vacuum is applied thereto on the platens 24 and 25, to hold the key mat in place in the apparatus 175. The apparatus 175, as discussed in detail in the aforementioned patent, provides trimming means, not shown, for preferably trimming at least three edges of the curved key mat 161, although all four edges may be trimmed if desired.

The trimmed key mat 161 is then removed from the apparatus 175 and placed in a casting box or mold, not shown, having walls so spaced as to receive the trimmed edges of the key mat 161 with a tight fit to prevent shifting of the key mat in the mold. Thereafter, a printing plate is cast in the usual manner with complete assurance that the relationship of the resulting printing image to the edge and axis of the printing plate will be the same for all plates cast.

The foregoing procedure is then repeated with the auxiliary mat 167, and any other auxiliary mats in the full page mat set, so that as many complete sets of printing plates are obtained as desired, the relationship of the printing image to the edges and axis of the printing plate being the same for all plates cast. Consequently, when the resulting set of printing plates is installed on a press with the edges of the plates in predetermined locations, the resulting partial reproductions derived from the printing plates of the set will be brought into register with a minimum of trial and error adjustments, since the plates will be true to the axis of the cylinder and will require only slight axial and circumferential adjustment, which is an important feature of the invention.

Thus, the present invention avoids the hereinbefore discussed difficulties of the prior art by eliminating any necessity for casting printing plates and running proofs to determine whether the various partial reproductions can be brought into satisfactory register. With the present invention, if defective mats are encountered, this fact is immediately noted in the comparator 20 without any necessity for casting printing plates. Also, even if slightly imperfect mats are being processed, a much better job of registering the various partial reproductions can be performed in the comparator 20 of the invention than by attempting to bring printing plates into register.

Although we have disclosed an exemplary embodiment of our invention herein for purposes of illustration, it will be understood that various changes, modifications and substitutions may be incorporated in such embodiment without departing from the spirit of the invention as defined by the claims which follow.

We claim as our invention:

1. In a comparator of the character described for stereotype mats, a platen, a second similar platen located slightly rearwardly with respect to said first mentioned platen, a semi-mirror and a full mirror spaced apart along an optical path having an observation point at one end thereof, said optical path being above said platens, said semi-mirror positioned above said first mentioned platen and so arranged that an image of said first mentioned platen will be projected along said optical path towards said observation point by said semi-mirror, said full mirror positioned above said second platen and so arranged that an image of said second platen will be projected by said full mirror along said optical path and through said semi-mirror to said observation point, said semi-mirror formed of two plates of glass, the plate furthest from said observation point having been partially coated with a reflective material, the two plates cemented together with the reflective partial coating between them; and the exposed faces of the plates coated with a low reflectance material, a source of light for said first mentioned platen located above said first mentioned platen, a source of light for said second platen located above said second platen, means shielding said mirrors from direct rays from said sources of light, separate control means for said sources of light for varying the relative illumination of said platens, corresponding grid lines on said platens, and vacuum means incorporated in each of said platens for holding a mat thereon.

2. In a comparator for stereotype mats and the like, a substantially horizontal platen, a second substantially horizontal platen located slightly rearwardly with respect to said first mentioned platen, a semi-mirror and a full mirror spaced apart along an optical path having an observation point at one end thereof, said optical path being above said platens, said semi-mirror positioned above said first mentioned platen and so arranged that an image of said first mentioned platen will be projected along said optical path towards said observation point by said semi-mirror, said full mirror positioned above said second platen and so arranged that an image of said second platen will be projected by said full mirror along said optical path and through said semi-mirror to said observation point, said semi-mirror formed of two plates of glass, the plate furthest from said observation point having been partially coated with a reflective material, the two plates cemented together with the reflective partial coating between them; said full mirror being a first surface mirror, a source of light for said first mentioned platen located above said first mentioned platen, a source of light for said second platen located above said second platen, separate control means for said sources of light for varying the relative illumination of said platens, means on each of said platens for holding a mat thereon, and means associated with said first mentioned platen for placing indicating marks on a mat positioned on said first mentioned platen.

3. In a stereotype mat comparator, a housing cabinet open at the front, a substantially horizontal mat-holding platen mounted in the front portion of said housing, a second similar substantially horizontal platen mounted at the rear of said housing at a higher elevation than said first mentioned platen, a semi-mirror adjustably mounted in the front of said housing above said first mentioned platen, a full mirror adjustably mounted in the rear of said housing above said second platen, said mirrors so positioned as to be located in the horizontal optical path of the eye of an operator stationed in front of said housing, said full mirror being of larger area than said semi-mirror, said mirrors arranged with their planes at substantially the same angularity with respect to the planes of the respective platens, means for holding a mat in predetermined position on said second platen, and means for marking a mat when placed in desired position on said first mentioned platen whereby, when a key mat is mounted on said second platen, an operator, while stationed in front of said housing, can place a series of auxiliary mats in turn on said front platen and cause registering marking to be placed on each auxiliary mat upon moving each auxiliary mat into optical registration with said key mat, while maintaining his position in front of said housing.

References Cited in the file of this patent

UNITED STATES PATENTS

| | | |
|---|---|---|
| 1,424,886 | Douglass | Aug. 9, 1922 |
| 1,636,834 | Peters et al. | July 26, 1927 |
| 2,027,524 | Fankboner | Jan. 14, 1936 |
| 2,073,040 | Wood | Mar. 9, 1937 |
| 2,122,474 | Karl | July 5, 1938 |
| 2,155,248 | Adams | Apr. 18, 1939 |
| 2,236,000 | Koessler et al. | Mar. 25, 1941 |
| 2,348,944 | White | May 16, 1944 |
| 2,379,279 | Costello | June 26, 1945 |
| 2,452,373 | Harley | Oct. 26, 1948 |
| 2,492,798 | Harley | Dec. 27, 1949 |
| 2,493,628 | Harley | Jan. 3, 1950 |
| 2,498,417 | Haff | Feb. 21, 1950 |
| 2,625,076 | Nosco | Jan. 13, 1953 |
| 2,641,963 | Carter | June 16, 1953 |
| 2,651,233 | Tondreau | Sept. 8, 1953 |
| 2,721,496 | Guthrie | Oct. 25, 1955 |